F. H. BUFFINTON & H. R. ALLEN.
DEVICE FOR NOTCHING BOX COVERS.
APPLICATION FILED JULY 17, 1913.
1,100,351.
Patented June 16, 1914.
2 SHEETS—SHEET 2.
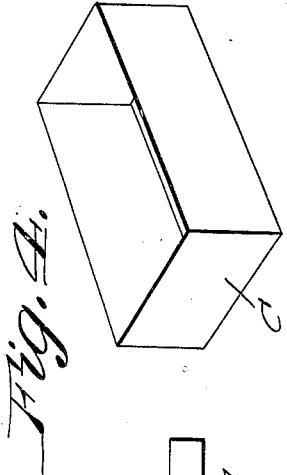
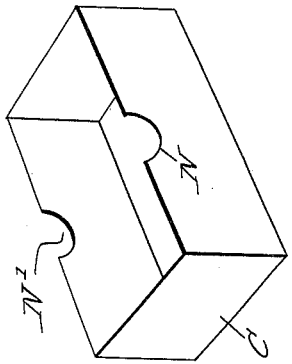
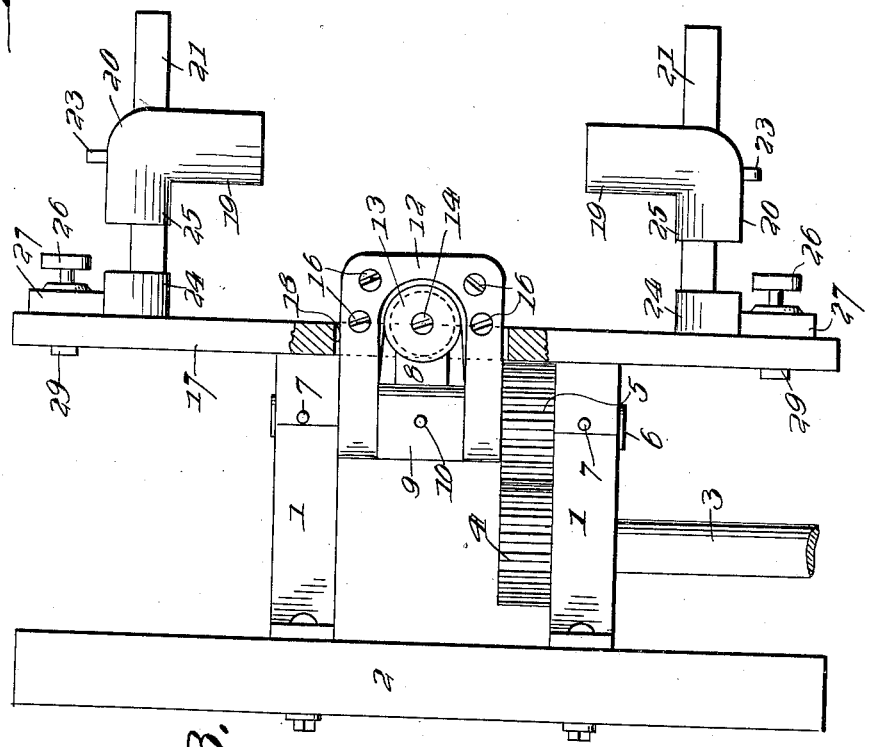
Witnesses
Ada E. Fagerty
Eleanor R. Ryder
Inventors
Frank H. Buffinton
Howard R. Allen
by Joseph A. Miller
Attorney
COLUMBIA PLANOGRAPH CO., WASHINGTON, D. C.

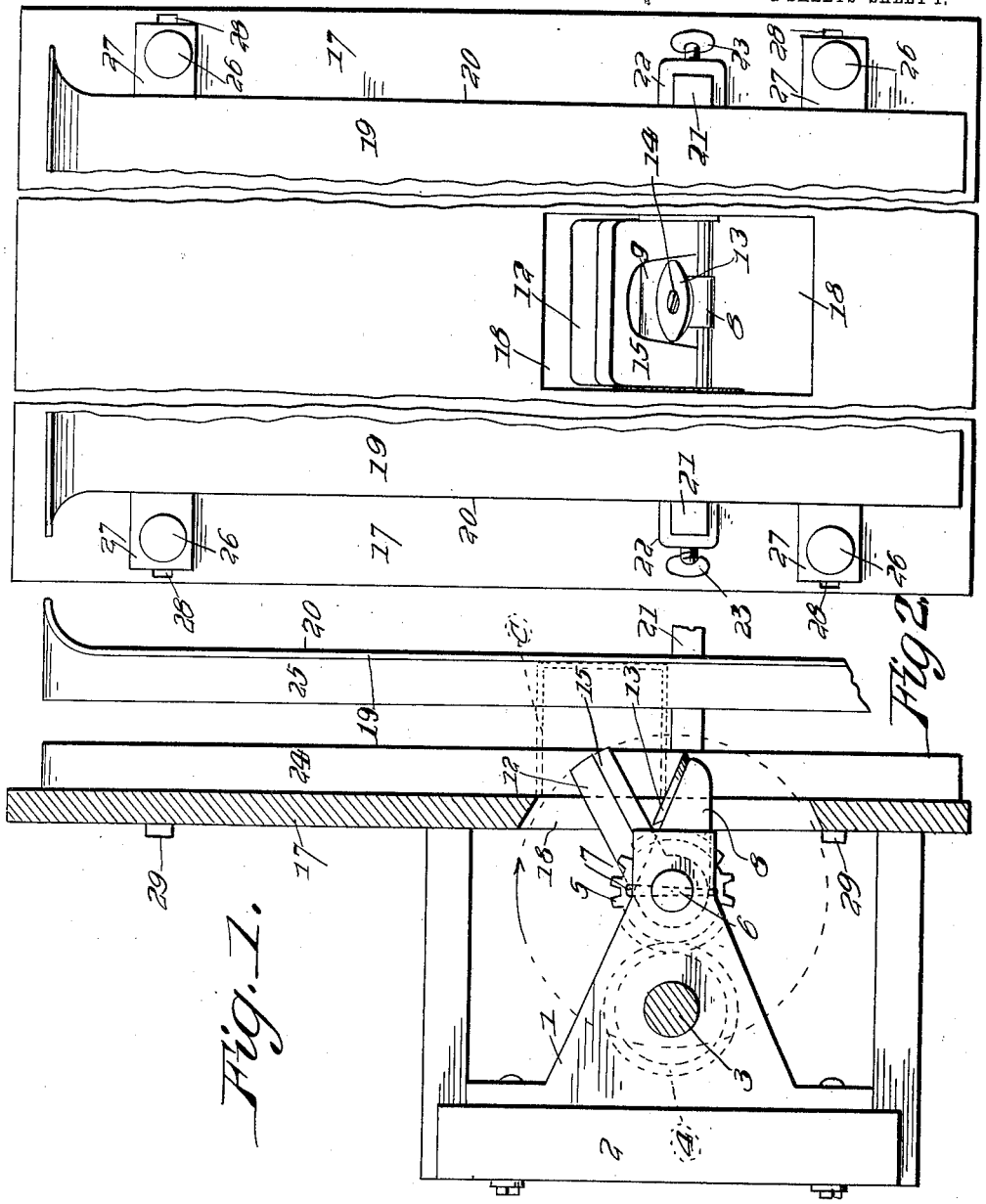

UNITED STATES PATENT OFFICE.

FRANK H. BUFFINTON, OF BRISTOL, AND HOWARD R. ALLEN, OF CRANSTON, RHODE ISLAND.

DEVICE FOR NOTCHING BOX-COVERS.

1,100,351. Specification of Letters Patent. Patented June 16, 1914.

Application filed July 17, 1913. Serial No. 779,469.

*To all whom it may concern:*

Be it known that we, FRANK H. BUFFINTON and HOWARD R. ALLEN, citizens of the United States, residing, respectively, in Bristol, in the county of Bristol and State of Rhode Island, and Cranston, in the county of Providence and State of Rhode Island, have invented a new and useful Improvement in Devices for Notching Box-Covers, of which the following is a specification.

This invention relates to certain new and useful improvements in devices for automatically cutting thumb notches in box covers, and the primary object thereof is to provide a machine for cutting a notch in one side of the box cover and then in the opposite side of the cover, both of which operations are entirely automatic.

A further object of the invention is to provide a device of the type mentioned which will act to quickly notch box covers and which will automatically discharge the covers upon completion of the notching thereof.

In the drawings: Figure 1 is a side elevation, partially in section, of the invention. Fig. 2 is a front elevation partly broken away. Fig. 3 is a top plan view, partly in section. Fig. 4 is a perspective view of a box cover prior to the cutting of thumb notches therein, and Fig. 5 is a similar view of the box cover after cutting of the thumb notches therein.

The invention embodies a pair of spaced brackets 1 which may be bolted to a vertical member 2. A driving shaft 3 is journaled in one of the brackets 1 and has a gear wheel 4 rigidly mounted thereon, which latter meshes with a gear wheel 5 that rotates freely on a stationary shaft 6. The shaft 6 is supported by the brackets 1 and is held stationary by means of taper pins 7 that pass through the brackets and shaft 6. An arm 8 has a sleeve 9 formed integral therewith, the sleeve receiving the shaft 6 and being held rigidly on the shaft by means of a pin 10, the ends of the sleeve 9 being spaced from the confronting faces of the brackets 1 so as to receive the free ends 11 of a rotary U-shaped carrier 12, the ends 11 being provided with apertures to receive the shaft 6 so as to allow the carrier to freely rotate about said
shaft 6. The gear wheel 5 is rigidly connected to one of the legs 11 of the carrier 12 so that rotation of the shaft 3 will effect similar movement of the carrier 12.

A circular or disk knife or cutter 13 is rigidly attached, by means such as screw 14, to the free outer end of the arm 8, while a substantially U-shaped knife or cutter 15 is rigidly attached by means of screws 16, to the under face of the carrier 12. A vertically disposed plate or wall 17 is provided with an opening 18 through which the rotary carrier 12 passes in its movements, the wall 18 forming one side of a box cover receiving guide-way, the other side of which guide-way is formed by the wings 19 of a pair of spaced opposed L-shaped strips 20. The strips 20 are adjustably mounted on bars 21 by means of loops 22 which latter are connected to the strips 20 and are rigidly held in adjusted position on the bars 21 by means of winged screws 23. The bars 21 are rigidly affixed to vertical members or strips 24 which latter with the parts 25 of the strips 20 form the end walls of the guide way, as depicted in Fig. 3. The strips 24 which, through the medium of the bars 21 support the strips 20, are adjustable relative to each other and to the plate 17 by means of screws 26 which engage through lugs 27 that are carried by and extend outwardly from the strips 24, the screws extending through transverse slots 28 formed in the plate 17 and being engaged with nuts 29 that abut the inner face of the plate 27.

From the above it will be seen that by means of the screws 26 the strips 24 may be adjusted to accommodate box covers of different lengths and since the strips 20 are carried by the strips 24 the latter will at all times have the parts 25 thereof in register with the faces of the strips 24 that form a part of the end walls of the guide-way. To adjust the strips 20 toward or away from the plate 17 to provide for the reception of covers of different widths, the screws 23 are manipulated in an obvious manner. The upper ends of the strips 20 and 24 are flared so as to enable the box covers to be more easily and quickly introduced in the guide way.

In operation the box cover C shown in Fig. 4 is placed in the top of the guide way whereupon the cover gravitates into the dotted line position depicted in Fig. 1, in which the lower side of the cover is engaged by the stationary knife 13. Rotary motion communicated to shaft 3 rotates the rotary carrier 12 causing the knife 15 of the latter to move down onto the upper face of the lower side of the cover, whereupon the knives or cutters 13 and 15 coöperate to cut a notch N in said lower side of the cover, and the knife 15 upon its continued downward movement forces the upper side of the cover down onto the knife disk 13 in which position the cover is then supported, while the knife 15 having passed the lower side of the cover then passes through the lower end of opening 18, and then moves upwardly and downwardly and acts on the upper face of the upper side of the box cover to cut the notch N' in the upper or other side of the cover, whereupon the cover gravitates past the knife 13 and through the guideway. The U-shaped rotary cutter carrier 12 due to its receiving the knife 13 in the space between its legs, is permitted to pass the stationary knife, as above described. The machine, as is therefore apparent, acts to automatically cut a notch first in one side of the cover and then in the other side thereof, the rotary cutting means itself moving the cover after cutting of one notch to a position where the other notch is cut.

Having thus described our invention, we claim as new and desire to secure by Letters Patent;—

1. In a machine for notching box covers, a stationary knife, and a knife which coöperates therewith and is rotatable relative to the stationary knife and which surrounds the latter in its rotating movements so as to pass the same and move the material operated upon away from the stationary knife upon completion of the notching operation.

2. In a machine for notching box covers, a stationary knife, and a knife which coöperates therewith and is rotatable relative to the stationary knife and which receives the latter in its rotating movements so as to pass the same, said rotatable knife being formed to engage one side of the cover after notching thereof to move said cover side downwardly past the stationary knife to thereby cause the other side of the cover to be engaged with and supported by the stationary knife whereby to notch said other side when the rotatable knife again descends.

3. In a machine for notching box covers, a passage way to receive the covers, stationary cutting means which projects in the passage-way, and rotatable cutting means which in its movements enters the passage-way, to coöperate with the stationary cutting means to notch one side of the cover and which upon completion of the notching operation moves the cover downwardly to engage the other side of the cover with the stationary cutting means and then leaves the passage-way.

4. In a machine for notching box covers, a passage way having a transverse opening, a stationary cutter extending in the passage way, a rotatable cutter which operates through said opening to surround and coöperate with the stationary cutter and to move the material operated upon away from the stationary cutter upon completion of the notching operation, and means to actuate said rotatable cutter.

5. In a machine for notching box covers, a passage way having a transverse opening, a shaft, a stationary arm rigidly secured to said shaft and projecting into said opening, a cutter on said arm disposed in the passage way, a U-shaped carrier having its legs rotatably connected to the shaft and operating in said opening, a cutter on the under face of said carrier for coöperation with the stationary cutter, said carrier receiving the stationary cutter in the space between its legs during the rotation of the carrier, and means to actuate the rotary carrier.

6. In a machine for notching box covers, a passage-way having a transverse opening, a shaft, a stationary arm rigidly secured to said shaft and projecting into said opening, a cutter on said arm disposed in the passage way, a U-shaped carrier having its legs rotatably connected to the shaft and operating in said opening, a cutter on the under face of said carrier for coöperation with the stationary cutter, said carrier receiving the stationary cutter in the space between its legs during the rotation of the carrier, and means to actuate the rotary carrier, including a gear freely rotatable on the stationary shaft and in rigid connection with the cutter carrier, a gear in mesh with the first named gear, and means to drive the second named gear.

7. In a box cover notching machine, a single notching means, and means to actuate same whereby upon completion of the notching of one side of the cover the notching means will move the cover and subsequently notch the opposite side of the cover.

8. In a machine of the type set forth, means for notching one side of the cover and for then moving the cover to notch the opposite side thereof including a stationary cutter and a rotary cutter which after initial notching of the cover moves the latter to a position for further notching thereof and upon further rotation effects said further notching.

9. In a box notching machine, a single notching means, and actuating means therefor whereby said notching means alone automatically and successively notches both sides of a box cover.

10. In a machine of the type set forth, a stationary cutter, and combined box cover cutting and feeding means associated with the cutter whereby one side of the cover is notched, and the cover then moved to bring the other side of the cover into engagement with the stationary cutter for notching of said other side upon continued movement of said combined means.

11. In a machine of the type set forth, a box cover guide way consisting of a plate which forms one wall of the guide way, spaced adjustable strips on the plate, and L-shaped strips adjustably carried by the first named strips.

12. In a machine of the type set forth, a box cover guide way consisting of a plate which forms one wall of the guide way, spaced adjustable strips on the plate, a bar extending outwardly from each strip and rigidly carried by the latter, and an L-shaped strip adjustably carried by each bar.

13. In a machine of the type set forth, means to support the box cover sides, and means which coöperates with said supporting means and which first enters the cover interior to notch one side of the cover and which then feeds the cover to cause the other side of the cover to engage said supporting means, and which upon continued movement leaves the cover interior and then moves down on top of the other side to notch the latter.

14. In a machine of the type set forth, notching means including an element which rotates in a vertical plane and which during its downward movement notches one side of a box cover and upon its following downward movement notches the opposite side of a box cover.

15. In a machine for notching box covers, a cutter for engaging one face of a side of a box cover and a second cutter for engaging the opposite face of said side of the box cover for notching said side and for then moving said side past the first named cutter.

16. In a machine for notching box covers, a cutter, means coöperating with said cutter to notch a side of the cover and for then moving the said side past the cutter upon completion of the notching operation.

17. In a machine for notching box covers, a notching mechanism, and means for actuating said mechanism to first effect notching of one side of the cover and to then move the cover in position for and to notch the opposite side of the cover.

18. In a machine for notching box covers, a stationary cutter and a rotatable cutter which incloses the stationary cutter in its rotating movements therepast so as to move the cover away from the stationary cutter upon completion of the notching operation, and a shaft on which both cutters are mounted.

19. In a machine for notching box covers, a stationary cutter and a U-shaped rotating cutter which receives the stationary cutter in the space between its legs during its movement therepast so as to move the cover away from the stationary cutter upon completion of the notching operation.

In testimony whereof we have signed our names to this specification in the presence of two subscribing witnesses.

FRANK H. BUFFINTON.
HOWARD R. ALLEN.

Witnesses:
ADA E. HAGERTY,
J. A. MILLER.

---

Copies of this patent may be obtained for five cents each, by addressing the "Commissioner of Patents, Washington, D. C."